United States Patent
Aizpuru et al.

(10) Patent No.: US 8,638,387 B2
(45) Date of Patent: Jan. 28, 2014

(54) MULTIPLE SPECTRAL SINGLE IMAGE SIGHTING SYSTEM USING SINGLE OBJECTIVE LENS SET

(75) Inventors: Jose Joaquin Aizpuru, Murphy, TX (US); Hugh Robert Bond, Dallas, TX (US); Bob Lee Brigance, Richardson, TX (US); Danny Robert Schoening, Lucas, TX (US)

(73) Assignee: Optex Systems, Inc., Richardson, TX (US)

( * ) Notice: Subject to any disclaimer, the term of this patent is extended or adjusted under 35 U.S.C. 154(b) by 221 days.

(21) Appl. No.: 13/357,802

(22) Filed: Jan. 25, 2012

(65) Prior Publication Data
US 2013/0229561 A1  Sep. 5, 2013

(51) Int. Cl.
*H04N 5/225* (2006.01)
*H04N 5/222* (2006.01)

(52) U.S. Cl.
USPC .............. 348/344; 348/343; 348/333.01

(58) Field of Classification Search
USPC .......... 348/335, 344, 370, 371, 375, 61, 359, 348/333.01, 343, 337; 359/350–361, 359/399–432, 618, 368–390, 362, 363
See application file for complete search history.

(56) References Cited

U.S. PATENT DOCUMENTS

| | | | |
|---|---|---|---|
| 3,505,465 A | 4/1970 | Rees | |
| 4,629,295 A | 12/1986 | Vogl | |
| 5,029,963 A | 7/1991 | Naselli et al. | |
| 5,035,472 A | 7/1991 | Hansen | |
| 5,079,416 A | 1/1992 | Filipovich | |
| 5,204,489 A | 4/1993 | Pellarin | |
| 5,282,082 A | 1/1994 | Espie et al. | |
| 5,448,671 A | 9/1995 | Wimmer | |
| 5,943,163 A | 8/1999 | Tartaglia | |
| 6,020,994 A | 2/2000 | Cook | |
| 6,111,692 A | 8/2000 | Sauter | |
| 6,262,768 B1 | 7/2001 | Williams | |
| 6,798,578 B1 | 9/2004 | Beystrum et al. | |
| 7,056,119 B2 | 6/2006 | Cabato et al. | |
| 7,880,962 B2 * | 2/2011 | Tartaglia | 359/353 |
| 8,326,142 B2 * | 12/2012 | Kravitz et al. | 396/333 |
| 2003/0157464 A1 * | 8/2003 | Tanassi et al. | 434/81 |
| 2005/0029458 A1 * | 2/2005 | Geng et al. | 250/347 |

FOREIGN PATENT DOCUMENTS

JP  411-064739 A  3/1999

* cited by examiner

*Primary Examiner* — Nhan T Tran
*Assistant Examiner* — Chan Nguyen
(74) *Attorney, Agent, or Firm* — Carl F. Melito (57) ABSTRACT

A sighting system is disclosed, comprising a housing with small upper mirror mounted in its upper center, redirecting light from a single objective lens set, and a larger lower mirror mounted coaxially relative to the lens set and upper mirror, both mirrors set at 45° and redirecting light at 90° angles to the lens set. The smaller mirror is positioned closer than the lower mirror to the lens set. A night camera system is used for receiving an image through the lens set redirected by the lower mirror and amplified through an intensifier before transmission to a video display monitor(s). A day camera system receiving the image from the lens set redirected by the smaller mirror transmits the image to the monitor(s) for separate display of the image, enabling simultaneous capture of the optimum amount of light by each camera, maximizing the housing's diametrical space to receive incoming light.

17 Claims, 8 Drawing Sheets

Position a large lower mirror approximately the same diameter as the housing at a lower center end of the housing and at a 45 degree angle relative to said lens set so as to redirect said image through an intensifier onto said night camera Position a small upper mirror at a higher center end of the housing, coaxially aligned with said large lower mirror and said lens set and also at a 45 degree angle relative to said lens set but closer to said lens set than said large lower mirror, said small upper mirror redirecting said image using only a small center portion of incoming light flux to said day camera

Figure 8.

Position a large lower mirror approximately the same diameter as the housing at a lower center end of the housing and at a 45 degree angle relative to said lens set so as to redirect said image through an intensifier onto said night camera Position a small upper mirror at a higher center end of the housing, coaxially aligned with said large lower mirror and said lens set and also at a 45 degree angle relative to said lens set but closer to said lens set than said large lower mirror, said small upper mirror redirecting said image using only a small center portion of incoming light flux to said day camera Feed the output from said day camera and said night camera as input to an image fusing means for an enhanced display of said image

Figure 9.

MULTIPLE SPECTRAL SINGLE IMAGE SIGHTING SYSTEM USING SINGLE OBJECTIVE LENS SET

FIELD OF THE INVENTION

This invention relates generally to an optical image improvement for day night sighting systems, including periscope-type devices, binocular-type devices, goggle-type devices and rifle scope-type devices. The improvement is made possible by a new method of simultaneous capture of just enough high intensity light to enable an image to be reflected onto a day camera and maximizing the amount of remaining low intensity light to reflect the same image onto a night camera using a single objective lens set within an objective assembly housing. The method of the invention discloses the optimization of the limited diametrical space of the housing to maximize the amount of light available for low light conditions.

BACKGROUND

Many military vehicles in use today employ the M36 or DIM36 weapon sight. These periscope-type sighting systems typically use mirrors and/or prisms to reflect light at approximately 45 degree angles to the axis of the objective lens set used in the device. The limitation of all prior art day night sighting systems, including periscope-type sighting systems, is that a separate objective lens set is used for each camera, one for day and one for night time viewing, and therefore, of necessity, are looking at different images of the same or similar field of view (FOV). To enhance these images, fusion means are employed in the prior art, but fusion also suffers from the same inefficient use of merging two different images of the same FOV.

Sighting systems can vary greatly depending on the application and origin of design. In cases where the requirements are for multiple detection schemes, such as day versus night, designs become more complicated in order to make the system perform properly while viewing each scheme. In some cases fusion is a requirement such that at least two views can be overlaid in order to get an image while looking at both detection schemes at the same time. Care must be taken such that the content of the images to be fused is close enough to being identical in content so that once fused, the extent of one image matches up with the extent of the other such that there is a good image. If the two images being fused can be created from the same bundle of light, the content is the same and fusion can occur, including variables such as perspective, field of view, and magnification. Once detected, electronic methods can get the images lined up and overlaid properly. But, if the incoming images do not carry the same content, not only can fusion not occur properly, but the user of the system may be able to detect differences in the image being displayed. For example, if there is an offset in one image relative to the other, something that is visible on a viewing monitor of the day may shift far enough such that it is not visible in the field of view of the night image being displayed. If this occurs, the user will obviously not be able to compare both images and hope to identify the object using both detection schemes.

What is needed is a Multiple Spectral Single Image Sighting System Using A Single Objective Lens Set and method that exploits the simultaneous capture of just enough high intensity light to enable an image to be reflected onto a day camera and maximizing the amount of remaining low intensity light to reflect the same image onto a night camera using a single objective lens set, instead of two, within an objective assembly housing. The method of the invention discloses the optimization of the limited diametrical space of the housing to maximize the amount of light available for low light conditions, so that the same image from two or more spectral bands can be transmitted each camera system to a video display monitor. Enhanced fusion of the same image, rather than from two distinct images is now possible. One way to achieve this is to ensure that the bundle of light that is being detected remains coaxial with respect to its objective lens set throughout its optical path until it gets to its detection surface. Many of the embodiments of this present invention, if not all, achieve this coaxial aligning so as to create and redirect duplicate images.

SUMMARY

One aspect of the present invention includes a periscope-type sighting system comprising a housing having at least one smaller upper mirror mounted in an upper center portion of the housing redirecting light at a 45 degree angle to a single objective lens set, and a larger lower mirror mounted in a lower center portion of the housing coaxially relative to said lens set and said at least one smaller upper mirror also redirecting light at a 45 degree angle to said lens set, said at least one smaller upper mirror positioned closer than said lower mirror to said lens set, a night camera system for receiving an image through said lens set redirected by said lower mirror, said night camera system transmitting said image through an intensifier to at least one video display monitor; said sighting system further comprising at least one day camera system for receiving said image from said lens set redirected by said at least one smaller upper mirror, said at least one day camera system transmitting said image to said at least one monitor for separate display of said image received by said first camera system and said image received by said at least one day camera system. One embodiment of the invention contemplates a sighting system wherein said night camera system and said at least one day camera system are board cameras. Another embodiment of the invention contemplates the sighting system wherein said at least one smaller upper mirror is at most one half the size of said lower mirror. The sighting system may further comprise an image fusion means that receives input from said night camera system and said at least one day camera system wherein said image is fused for display on said at least one monitor. The sighting system may employ said intensifier having an 18 mm image intensifier tube. The sighting system may employ at least one high resolution color flat panel display monitor. The sighting system accordingly may include using at least one monitor electronically displaying a plurality of reticles that is in focus over a plurality of ranges. The monitor of one embodiment is operable to provide still shots of said image. The sighting system of still yet another embodiment includes said night camera system and said at least one day camera system that are adapted to operate on a mobile platform. The sighting system of still yet another embodiment includes said night camera system and said at least one day camera system transmit said image to said at least one monitor by radio waves.

The present invention uses lenses, mirrors and the image intensifier tube to create a flat screen image for the human eye to observe, along with a system to project a reticle onto the tube for firing. The integrated sight has three main components; the Head Assembly, the Mid-Body, and the Elbow. In one aspect of the invention, the Head delivers light to both the Mid-Body and the Elbow, for Day and Night vision, respectively. The present invention offers a new, useful and nonobvious method for combining Day and Night into just the Elbow. By using two cameras and optical systems designed to each create an image for Day and Night, the user can now switch between Day and Night viewing in the Elbow. In addition, the reticle once projected can now be electronically created and zeroed by the user. The eyepiece from prior art periscopes can now be removed. The entrance pupil to the system remains the same: a large light-collecting cylinder with optics which deliver the optical bundle to the reflecting mirrors of the invention. Prior art Elbows use a single mirror to deliver light for a night image. The present invention uses two mirrors, stacked virtually on top of each other, now enabling the splitting of optical paths utilized for day and night viewing accordingly, but of the same image, not possible in prior art periscope-type sighting systems. Focusing using the industry standard "green ring" is supported by the present invention. The cameras of the present invention do not require separate focusing, because they are focused to infinity within their cells. System functions contemplated by the present invention, but not depicted in the drawings, can include, optical zoom, pan-ability, reticle toggle for white and black; reticle toggle off and on; and brightness control of the cameras. The present invention can transmit many digital outputs for viewing, with a preferred embodiment delivering two output signals for Day and two for Night, one each for a "Commander Display", and the other for distribution throughout the vehicle. Yet another embodiment of the present invention includes a laser range finder which can now be utilized within the Elbow by placing a beam splitter above the mirror stack and by placing the laser range finder above the Day camera. It could also be incorporated into the Mid-Body where the unity view mirror is if this mirror is converted to beam splitter.

Several possible embodiments of the invention contain multiple cameras, and their related electronics that convert the optical data to electronic data that can be displayed. It is understood that the properties of these cameras and their electronics contain the same performance and display characteristics. This is a critical part of the system since content being the same is crucial to performance, specifically for the fusion concept. If a user has multiple monitors and is displaying these views simultaneously, it is assumed that the preference would be to have the same content so there is no doubt about what is being displayed on one monitor versus the other. The cameras and monitors must be similar in performance in order to keep the view matched to enable detection and identification. In cases where detection and identification are important, such as military uses, positive detection and identification are paramount.

Other possible embodiments may have images rotated or flipped. As with any mirror image, an incoming image is flipped vertically or horizontally only once with each mirror. Optical elements, such as lenses, also sometimes can flip an image, although not always just flip, but can also rotate them 180 degrees from the original object. Rotating and flipping are different concepts and must be understood in order to understand what electronic methods will be needed to "right" an image once it is detected. A single 180 degree rotation can be simulated by flipping an object vertically, then flipping it horizontally. Sequence is not important, but both must occur to simulate 180 degree rotation.

Several possible embodiments contemplated locate one camera system relative to the other. Depending on the application, there may be a need to have them located side by side, or maybe opposite each other. In either or any case, in order to achieve image content duplication, coaxial alignment must be observed. Subsequent reflections must remain coaxial all the way throughout the system until detection is made on the critical detection surface for each of the systems.

A contemplated "non-periscope-type" embodiment of the present invention comprises a housing having at least one small upper mirror and corresponding redirecting mirror, said at least one small upper mirror mounted in an upper center portion of the housing redirecting light at a 45 degree angle coaxially to a single objective lens set with said at least one corresponding redirecting mirror mounted adjacent to said at least one small upper mirror in an upper side portion of the housing facing the opposite direction relative to said lens set and said at least one small upper mirror redirecting light at a 235 degree angle to said lens set, said at least one small upper mirror and corresponding redirecting mirror positioned closer than an image intensifier to said lens set, a night sensor mounted at the bottom of the housing adjacent said image intensifier for receiving an image through said lens set and said image intensifier of non-redirected light; said sighting system further comprising at least one additional sensor for simultaneously receiving said image from said lens set redirected by said at least one small upper mirror and corresponding redirecting mirror, said at least one sensor receiving said image of redirected light for simultaneous viewing of said image received by said night sensor and said at least one additional sensor. The sighting system of another embodiment contemplates said at least one small upper mirror being at most one half the diameter of said lens set. The sighting system of still yet another embodiment includes said intensifier being an 18 mm image intensifier tube.

A new method is disclosed of simultaneous capture of just enough high intensity light to enable an image to be reflected onto a day camera and maximizing the amount of remaining low intensity light to reflect said image onto a night camera using a single objective lens set within a housing, the steps comprising:
  a. Positioning a large lower mirror approximately the same diameter as the housing at a lower center end of the housing and at a 45 degree angle relative to said lens set so as to redirect said image through an intensifier onto said night camera; and
  b. Positioning a small upper mirror at a higher center end of the housing, coaxially aligned with said large lower mirror and said lens set and also at a 45 degree angle relative to said lens set but closer to said lens set than said large lower mirror, said small upper mirror redirecting said image using only a small center portion of incoming light flux to said day camera.

The method may also include said day camera and said night camera which are board cameras. The method may also include said small upper mirror being at most one half the size of said large lower mirror. The method may also include said intensifier being an 18 mm image intensifier tube. The method may also include said day camera and said night camera being adapted to operate on a mobile platform. The method may also include said day camera and said night camera transmitting said image to at least one video display monitor. The method may also include the step of:
  c. Feeding the output from said day camera and said night camera as input to an image fusing means for an enhanced display of said image.

DETAILED DESCRIPTION OF VARIOUS PREFERRED EMBODIMENTS

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

Figure 3:
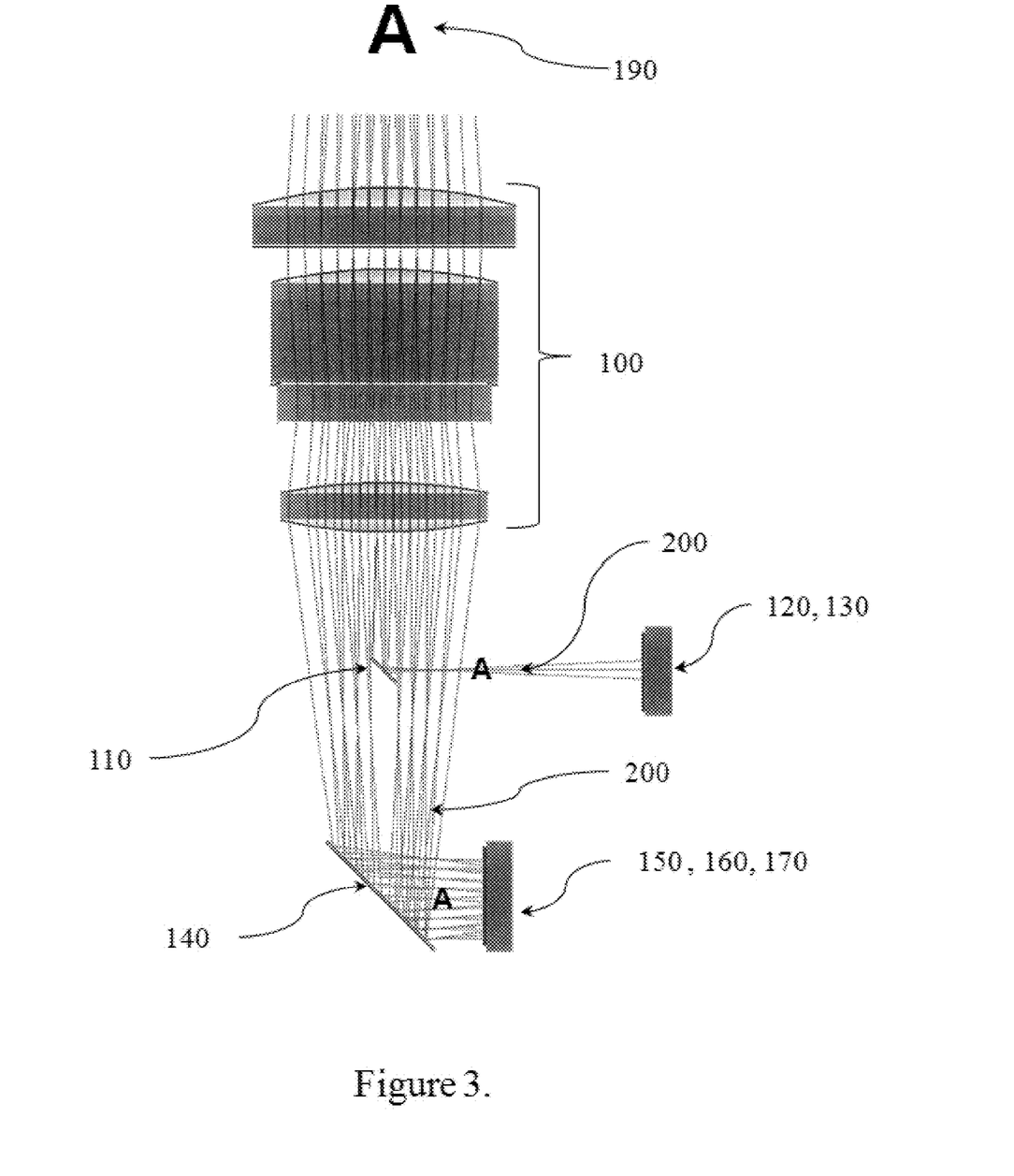
FIG. 3 illustrates one contemplated embodiment of a Multiple Spectral Single Image Sighting System Using Single Objective Lens Set by which light and the same image is reflected by coaxial mirrors to a single objective.

The terms a or an, as used herein, are defined as one or more than one. The term plurality, as used herein, is defined as two, or more than two. The term another, as used herein, is defined as at least a second or more. The terms including and/or having, as used herein, are defined as comprising (i.e., open language). While a particular configuration for the invention is shown in FIG. 3, those skilled in the art will appreciate that variations and modifications are possible, and such variations and modifications are within the scope of this invention.

The present invention relates to enabling the simultaneous viewing of an object in the field of view of a sighting system or periscope using two or more sensing techniques. The principles of the present invention are described with reference to the attached drawings to illustrate the structure and operation of example embodiments used to implement the present invention. Using the diagrams and descriptions in this manner to present the invention should not be construed as limiting its scope. Additional features and advantages of the invention will in part be obvious from the description, including the claims or may be learned by the practice of the invention. Descriptions of well known components and processing techniques are omitted so as to not unnecessarily obscure the explanation of the embodiments illustrated herein.

Figure 1A:
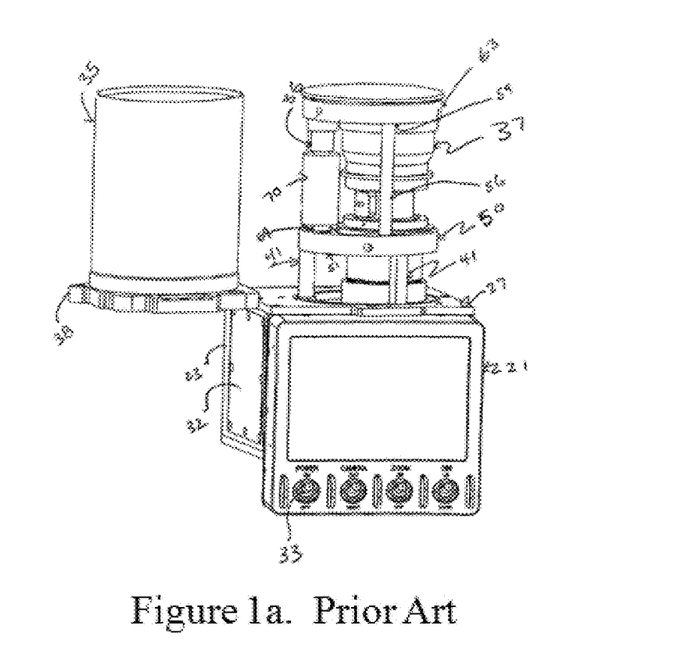
FIG. 1a illustrates a typical prior art implementation of a day night periscope using two objective lens sets.
Figure 1B:
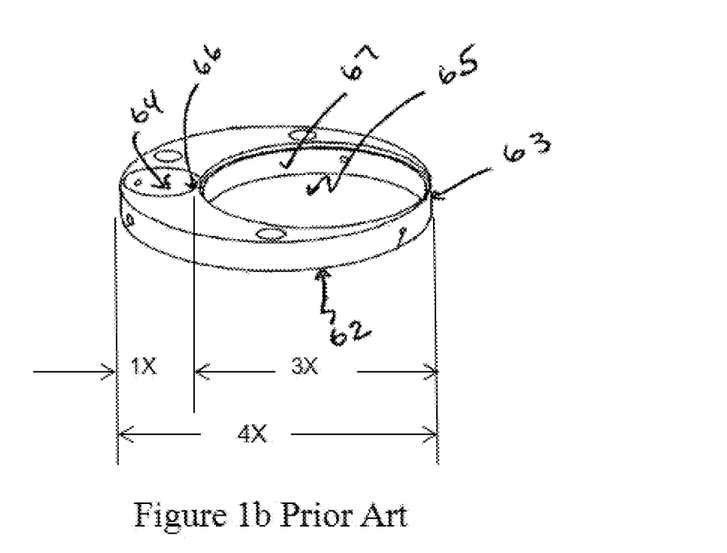
FIG. 1b further illustrates the prior art implementation of a day night periscope using two objective lens sets.
Figure 2A:
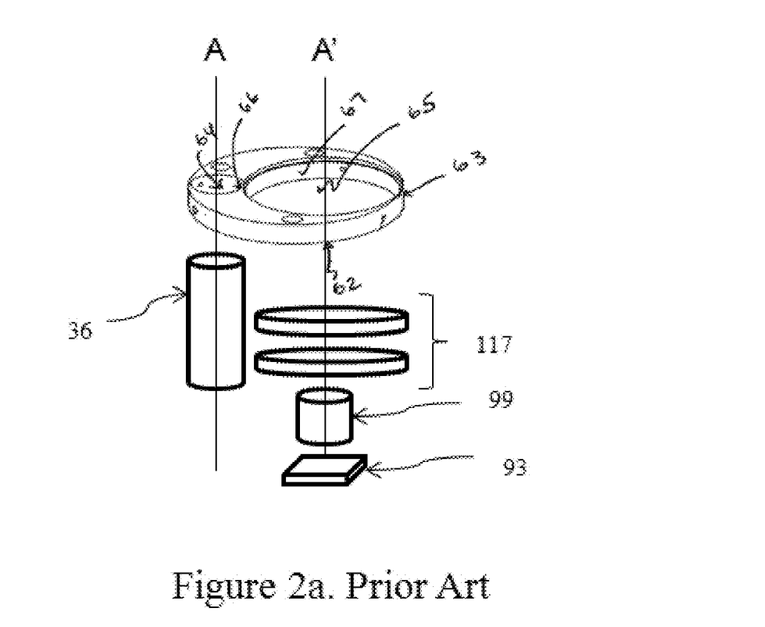
FIG. 2a illustrates that, in the typical prior art implementation of a day night periscope using two objective lens sets, two different images are transmitted to the video display monitor.

Referring now to FIGS. 1a, 1b and 2a, which are disclosed in U.S. Pat. No. 7,880,962 (Tartaglia). FIG. 1a discloses a system of creating multiple images using a day camera 36 and a night camera 37 to be displayed on a monitor 21. Top ring 63 serves as a method to house the two cameras. FIG. 1b shows top ring 63 is fabricated such that incoming light falls upon, and is proportioned to, one of two apertures 64 and 65, aperture 64 for the day camera 36 or aperture 65 for the night camera 37. All of the incoming light that does not fall onto either of these two apertures and collected for the cameras is blocked by the top surface of top ring 63, and hence not utilized. This is wasteful of the available space in the objective assembly to accommodate a maximum of incoming light for night viewing. Estimating a ratio of 3 to 1 of the said apertures 64 and 65 whose combined aperture diameter is 4×, the ratio values of total light collected by the system aperture area ($\pi R2$) compared to the light collected by the apertures of the individual cameras is 4 units (R2=4) for total, 2.25 units (R2=2.25) for the night, and 0.25 units (R2=0.25) for the day. This estimate shows that approximately 62.5% ((2.25+0.25)/4) of the light that enters the system is utilized. The prior art employs two sets of objective lenses (see FIG. 2a) for two cameras that transmit separate images to a video display monitor having a toggle switch to switch back and forth from the Day camera to the Night camera. Note that such sighting systems having a video display monitor with switch activation means are found elsewhere in the prior art. See U.S. Pat. No. 5,204,489 (Pellarin) (disclosing in col 6, lines 41-42 that "This video reticle can be of two types: a reticle mechanically adjustable in elevation and azimuth and projected in the video channel (upstream of the camera). A reticle electronically addressable on the associated monitor."; and the modularity of various features like day/night viewing and laser range finders, etc. It also references the use of a "light intensifier tube" 31; See also: U.S. Pat. No. 7,056,119 (Cabato); U.S. Pat. No. 3,505,465 (Rees) which is a periscope for a tank, having a television viewing system (34) and is a "television monitor" . . . then it calls out a "screen operated switch" (50) which allows the driver to select the portion of the horizontal field he/she wishes to view, which is a switch to change horizontal field and can be used to switch between day and night; U.S. Pat. No. 6,262,768 (Williams), U.S. Pat. No. 6,020,994 (Cook), and U.S. Pat. No. 5,035,472 (Hansen). The use of 18 mm intensifier tubes is also well known in the art. See U.S. Pat. No. 5,029,963 (Naselli) and U.S. Pat. No. 5,448,671 (Wimmer). Note in FIG. 2a, that top ring 63 is assembled such that day camera 36 captures the light that is collected by aperture 64 and the night system, including night camera objective 117, intensifier tube 99, and night camera 93, captures the light that is collected by aperture 65. It should be obvious that as these two cameras get further apart from each other, the perspective of any object that is being viewed will change. In this figure, the two cameras are as close as they can get to each other, limited by the aperture design of the top ring 63, yet the content of the two images is different, making the object appear as two different object views, object A and object A'.

Figure 2B:
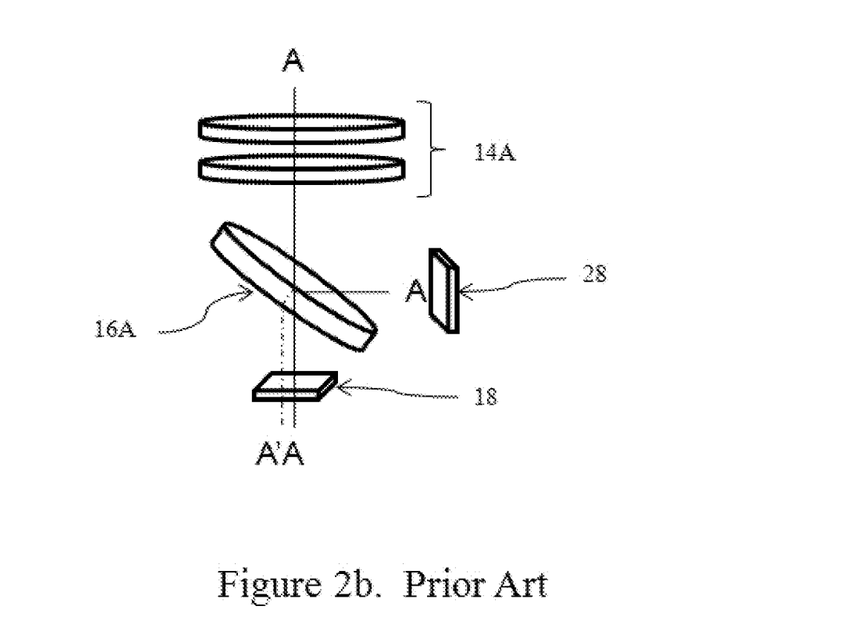
FIG. 2b illustrates a typical prior art implementation of a day night periscope using a single objective lens set using a beam splitter.

FIG. 2b was taken from a prior art reference (i.e. U.S. Pat. No. 5,035,472 (Hansen)) and shows another issue that is created in some systems, known in the art as "image shift" due to refraction. As light passes through any partially reflective beam splitter FIG. 4, 16A which is not perpendicular to incoming light, the change in the index of refraction from air to glass to air will cause this shift. The amount of shift will be determined by the thickness of the beam splitter and the difference in the two indices (air and glass). The thicker the glass or the larger the change in index, the larger the shift. In this example object A will transfer through the objective lenses 14A and reflect off the top of the beam splitter 16A to be projected onto the intensifier tube 28, with no shift. As it travels through the beam splitter, it will shift to location A' as it arrives at the focal plane array 18. Had the beam splitter not shifted it, it would have been projected onto location designated by A on the focal plane array. As you can see, image shift is something that must be accounted for in optical systems for accuracy. FIG. 2b shows that a single objective lens set is employed, but a beam splitter is necessary for operation. See also U.S. Pat. No. 5,084,780 (Philips) and U.S. Pub. No. 20070013997 (Zadravec). This is more expensive to manufacture due to the cost of the beam splitter. Beam Splitters inherently will have some thickness and optical properties which will take the image out of the coaxial plane. One can compensate for this inefficiency by then offsetting the camera systems, but again, it is inefficient and requires manual intervention. Further, the beam splitter is an additional optical element in the system which will obviously add cost and can potentially alter the image due to impurities or misalignment. In addition, the two surfaces of a beam splitter have to be relatively parallel to each other or image constancy issues can arise, besides shifting problems that occur with beam splitters. It can become a magnification issue leading to image distortion. This is because the surfaces of the beam splitter in most systems are not perpendicular to the incoming bundle of rays, by design. Applicant's reflected image does go through glass to get to the mirror, but both of the surfaces are perpendicular to the incoming main ray, so this does not occur.

Referring now to FIG. 3, applicants preferred embodiment is depicted, where a beam splitter is no longer required to obtain the enhanced image displays that are possible by using the same image for display by either day or night, and for use with fusion means, so that pixel by pixel, a better, more efficient and reliable alignment of pixels is possible to fuse to a better quality image than possible in the prior art. The present invention is made up of a series of lenses that serves as the objective 100 of the system. The incoming rays to this objective carry an image 200 of the object 190 in the field of view of the system. A small mirror serving as the day mirror 110 and a larger mirror serving as the night mirror 140, both mounted at a 45 degree angle to the incoming light, redirect the said image 200 into their respective imaging systems, made up of day lenses 120 and day camera 130 for the day portion of the system, while an intensifier tube 150, night lenses 160, and night camera 170 make up the night portion of the system. It is important to note that the rays carrying image 200 are identical in content, namely perspective, field of view, and magnification, after being redirected from their respective mirrors because the mirrors are mounted in a coaxial fashion. There is no perspective change as discussed in FIG. 2a. There is also no image shift to account for in this system as discussed in FIG. 2b, caused by the transition through the beam splitter. It is also important to note that the system is intended to collect light ranging from collimated light (light entering the system normal to the lens set) to slightly non-collimated light (light entering the system at an angle other than normal, but not at extreme angles such that the origin of those rays are out of the field of view of the system). It is this light that is transported, in its entirety after being captured at the entrance point of the objective 100, as an image 200 to the inputs of the said imaging systems.

Figure 4:
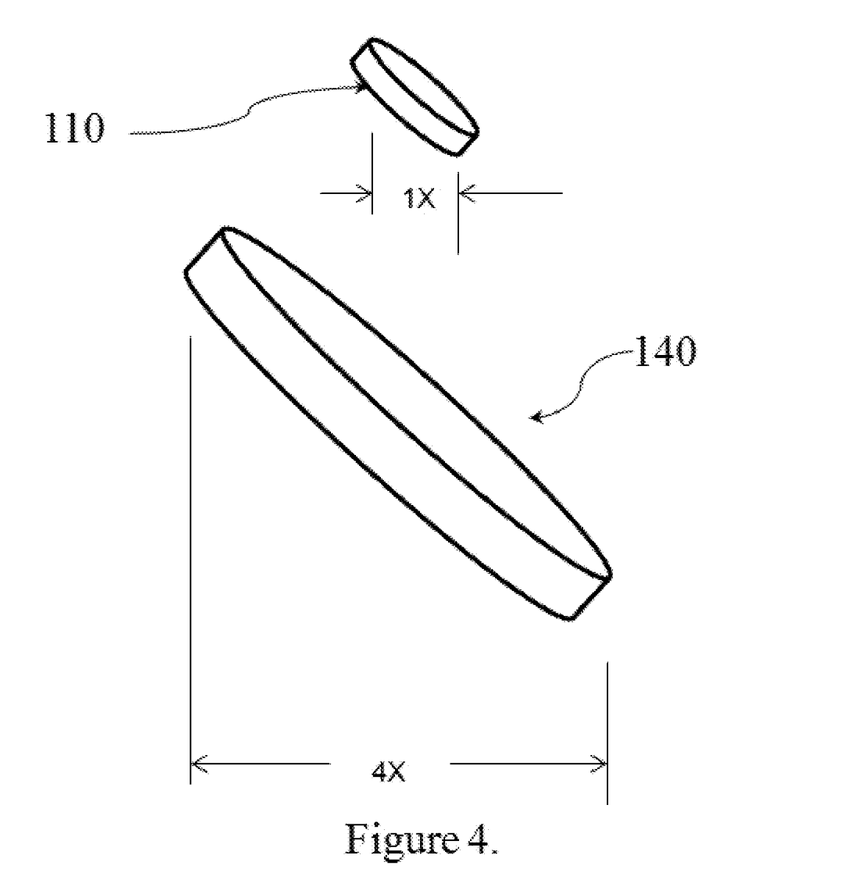
FIG. 4 depicts the coaxial mirrors of the present invention.

Referring to FIG. 4, the present invention is different from prior art in the efficiency of utilization of incoming light. In the present invention, all of the light that is not redirected by the small day mirror 110 continues on to be captured and redirected by the night mirror, 140. Note that the relative difference between the night mirror 140 in the present invention and the night aperture 65 from "FIG. 1b Prior Art" is essentially the limiting item in each of the two inventions with respect to the proportion of total available captured light which enters the night camera systems. Using the prior example where the night camera accounted for collecting 2.25 units for the night, the present invention collects 3.75 units (4-0.25) for the night camera, or 93.8% of the total available light. This represents 66.7% additional light (3.75/2.25) being utilized by the night camera, and a utilization improvement of the total system of 60% (4/2.5). It is the coaxial placement of the two said mirrors that enables the utilization improvement shown. In turn, the relative physical size of the two said mirrors enables individual said imaging to perform based on the amount of light that is delivered at each of the imaging points of the system. In other words, if the small mirror 110 is too large, the night portion of the system will not detect properly. If the small mirror 110 is too small, the day portion of the system will not perform properly.

Figure 5:
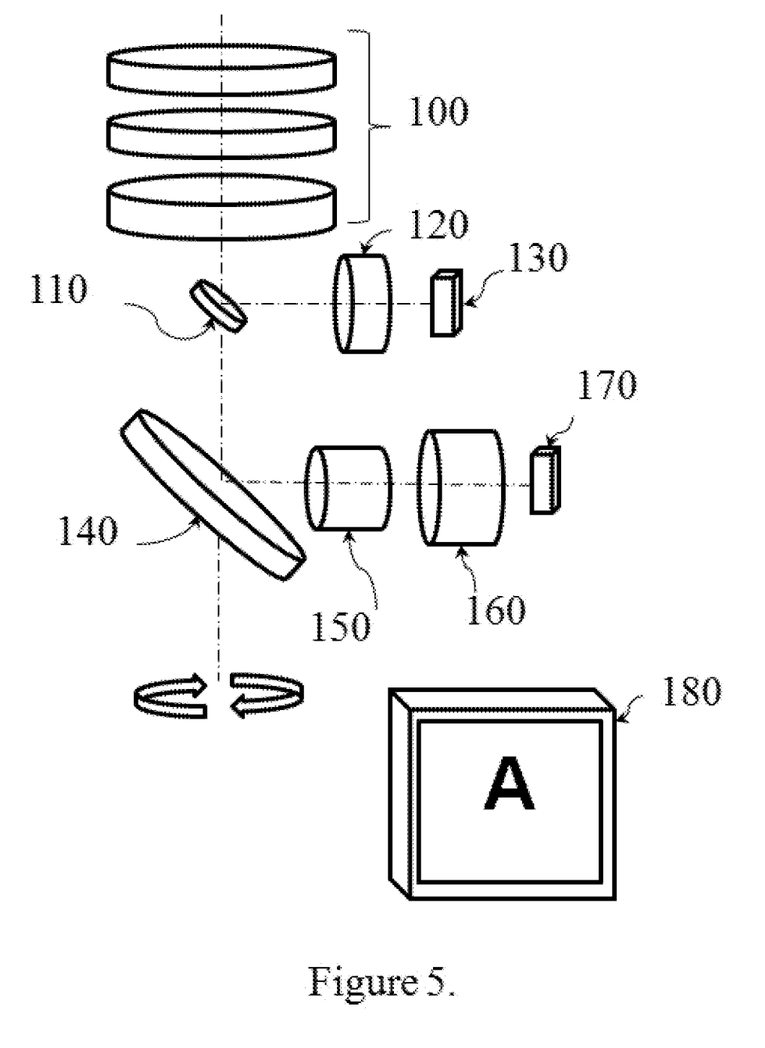
FIG. 5 depicts the method of the present invention.

Referring to FIG. 5, a monitor 180 is introduced. The camera systems and associated electronics convert the image into electronic data and deliver a video stream of the original object 190 from FIG. 3. Also it should be noted that the complete lower portion of the sighting system, including the night mirror 140, intensifier tube 150, night imaging lenses 160, and night camera 170, can be rotated on the objective optical axis together as an entire system to any position to allow relocation of the elements. As this night portion of the sighting system is rotated, the displayed image on the monitor 180 will also rotate for each degree of rotation unless the camera itself is rotated on its own axis to account for each degree of rotation. Alternately, electronic compensation in the controlling software could adjust for this rotation to keep displayed image upright.

Figure 6:
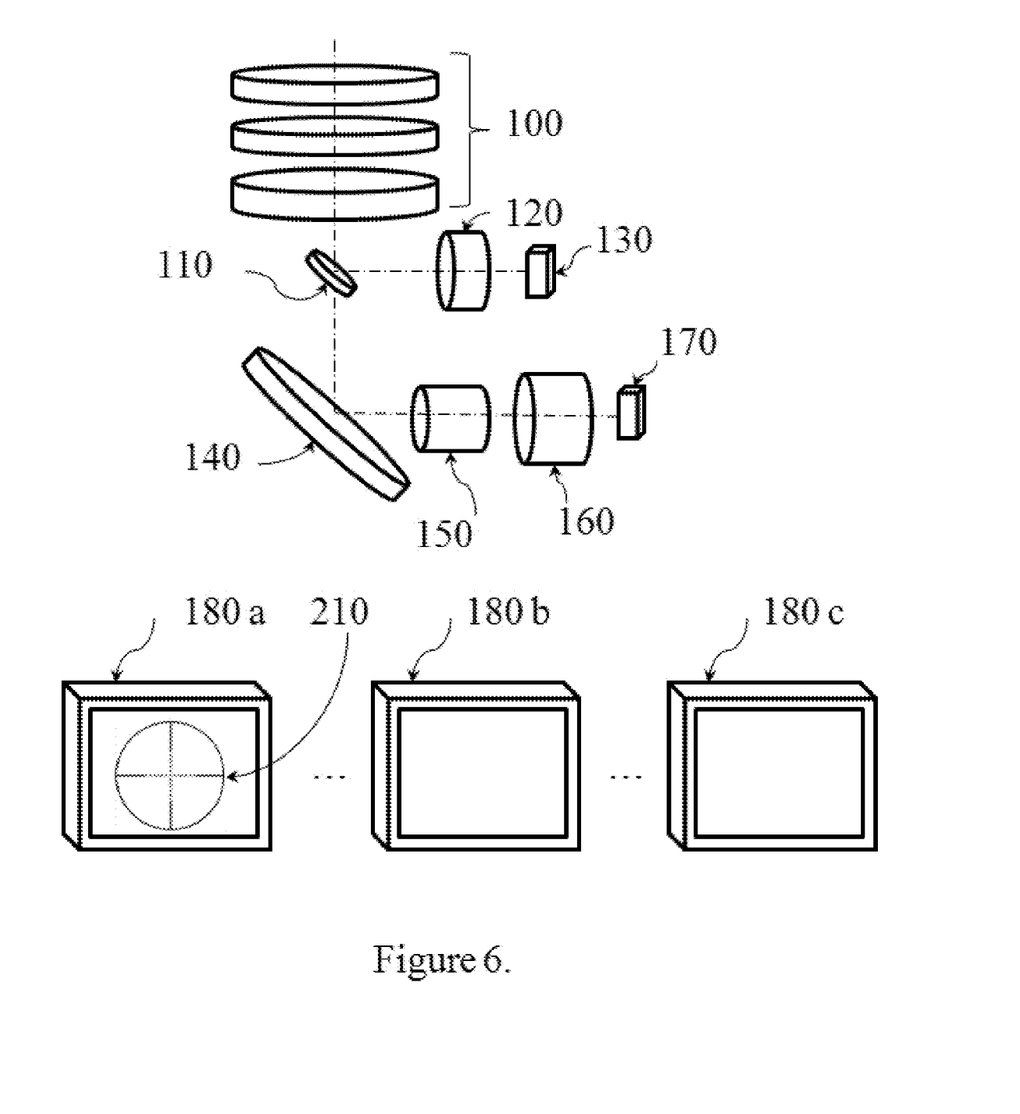
FIG. 6 depicts the method of the present invention with electronic reticles displayed on one or more video display monitors.

Referring to FIG. 6, the present invention has the capability to present simultaneous video feeds on multiple monitors. The video processed from the day imaging system 120 and 130 could be displayed on monitor 180a while the video processed from the night imaging system 150, 160, and 170 could be displayed on monitor 180b. With the appropriate software resident on the system, an alternate video stream made up of a fusion of the two video streams being displayed on monitor 180a and monitor 180b could be displayed on monitor 180c. It is critical to understand that this fusion, in order to function properly, would require pixel to pixel content correlation along with mechanical alignment and timing of the two video streams. In the present invention, the fact that the content of the image 200 is identical after being redirected from the day mirror 110 and the night mirror 140 enables this fusion. Additionally, a reticle 210 can be electronically created such that it enables the user to maneuver the larger system, which encompasses the present invention within it, and target any object(s) in the field of view. This reticle 210, which can be displayed on any of the simultaneous video signals electronically, can be aligned and calibrated with the individual video feeds of the cameras as desired with the appropriate software.

Figure 7:
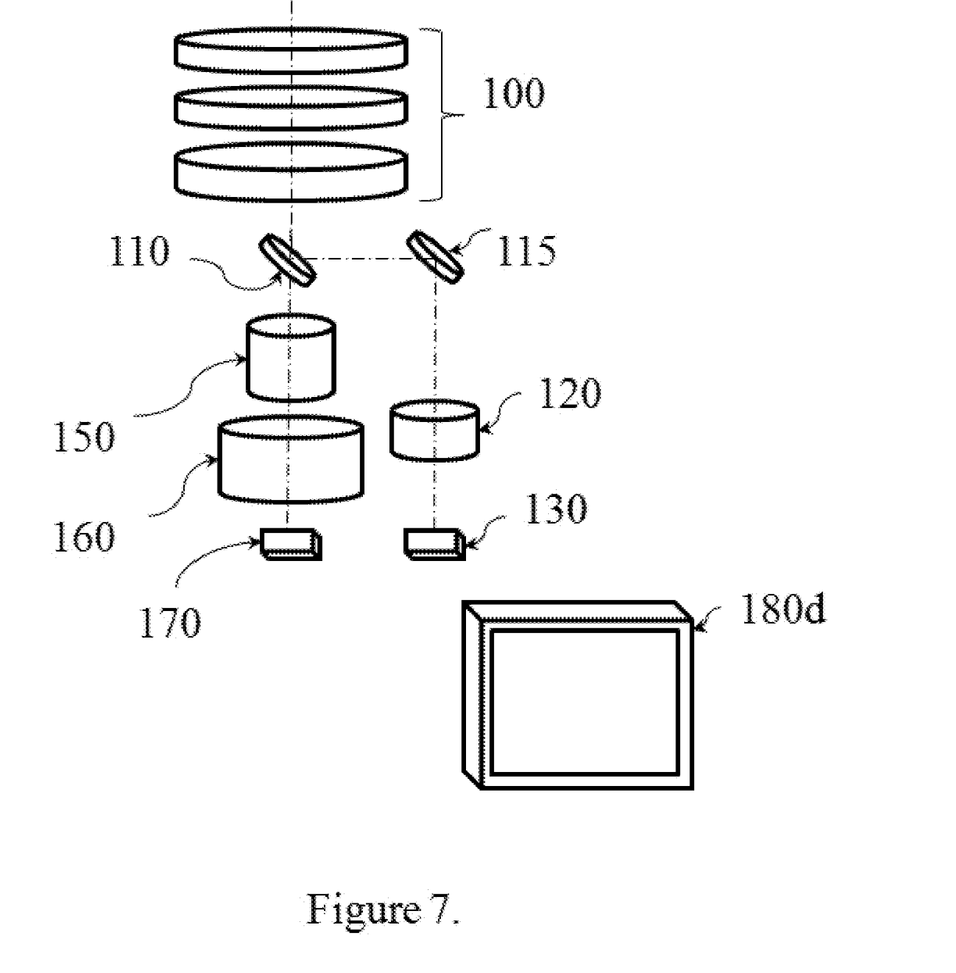
FIG. 7 depicts a "non-periscope-type" embodiment of the present invention.

Referring to FIG. 7, an additional day mirror 115 can be placed within the system to bend the light one more time such that the remaining items of the day system, including the day lenses 120 and the day camera 130, can be relocated for proximity to the night system in cases where proximity is a design feature or space is a constraint of the system.

Figure 8:
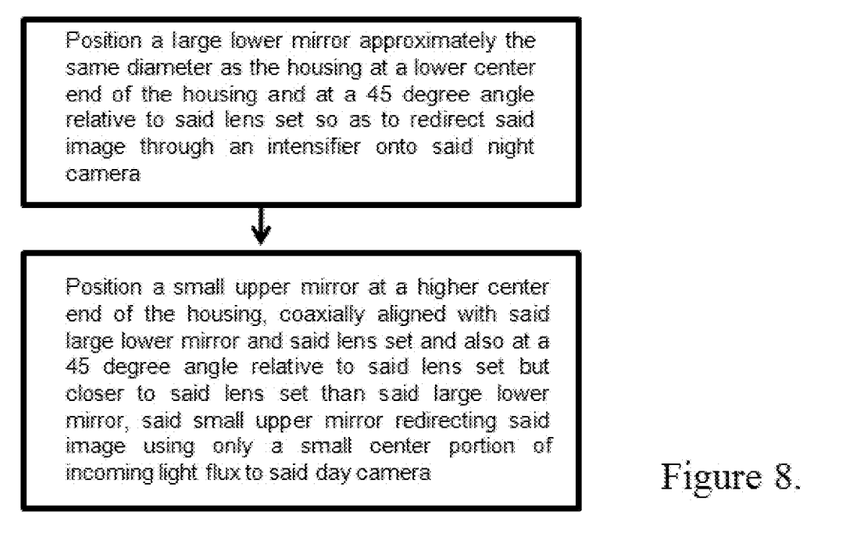
FIG. 8 is a block diagram that illustrates the method steps of one embodiment of the present invention.
Figure 9:
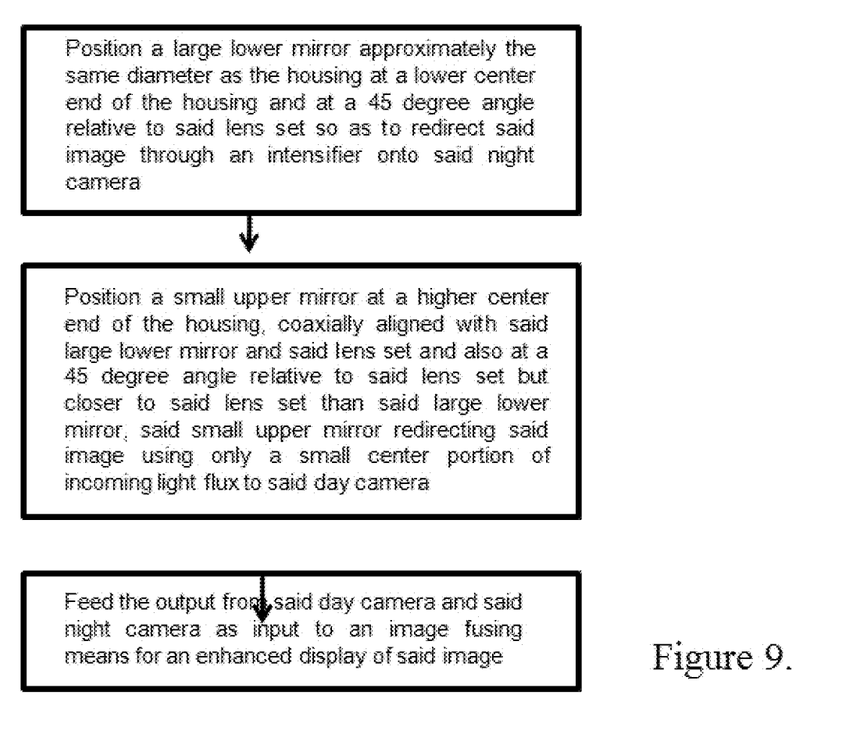
FIG. 9 is a block diagram that illustrates the method steps of another embodiment of the present invention.

As described above, the method of the invention is shown in block diagrams in FIGS. 8 and 9 that details the various steps disclosed to practice the invention. FIG. 8 depicts the first two steps to simultaneously capture just enough high intensity light to enable an image to be reflected onto a day camera and maximizing the amount of remaining low intensity light to reflect said image onto a night camera using a single objective lens set within a housing, the steps comprising:

a. Positioning a large lower mirror approximately the same diameter as the housing at a lower center end of the housing and at a 45 degree angle relative to said lens set so as to redirect said image through an intensifier onto said night camera; and b. Positioning a small upper mirror at a higher center end of the housing, coaxially aligned with said large lower mirror and said lens set and also at a 45 degree angle relative to said lens set but closer to said lens set than said large lower mirror, said small upper mirror redirecting said image using only a small center portion of incoming light flux to said day camera.

Then FIG. 9 culminates with a third step of the method of a preferred embodiment:

c. Feeding the output from said day camera and said night camera as input to an image fusing means for an enhanced display of said image.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A sighting system comprising a housing having at least one smaller upper coaxial mirror mounted in an upper center portion of the housing redirecting light to a single objective lens set, and a larger lower coaxial mirror mounted in a lower center portion of the housing coaxially relative to said lens set and said at least one smaller upper coaxial mirror the redirecting remaining light to said lens set, said at least one smaller upper coaxial mirror positioned closer than said larger lower coaxial mirror to said lens set, a night camera system for receiving an image through said lens set redirected by said larger lower coaxial mirror, said night camera system transmitting said image through an intensifier to at least one video display monitor; said sighting system further comprising at least one day camera system for receiving said image from said lens set redirected by said at least one smaller upper coaxial mirror, said at least one day camera system transmitting said image to said at least one monitor for separate display of said image received by said first camera system and said image received by said at least one day camera system.

2. The sighting system according to claim 1 wherein said night camera system and said at least one day camera system are board cameras.

3. The sighting system according to claim 1 wherein said at least one smaller upper coaxial mirror is smaller in diameter than said larger lower coaxial mirror.

4. The sighting system according to claim 1 further comprising an image fusion means that receives input from said night camera system and said at least one day camera system wherein said image is fused for display on said at least one monitor.

5. The sighting system according to claim 1 wherein said intensifier has an 18 mm image intensifier tube.

6. The sighting system according to claim 1 wherein said at least one monitor is a high resolution color flat panel display monitor.

7. The sighting system according to claim 1 wherein said at least one monitor electronically displays a plurality of reticles that is in focus over a plurality of ranges.

8. The sighting system according to claim 1 wherein said at least one monitor is operable to provide still shots of said image.

9. The sighting system according to claim 1 wherein said night camera system and said at least one day camera system are adapted to operate on a mobile platform.

10. The sighting system according to claim 1 wherein said night camera system and said at least one day camera system transmit said image to said at least one monitor by radio waves.

11. A method of simultaneous capture of a minimum amount of higher intensity incoming light flux to enable an image to be reflected onto a day camera and maximizing the amount of remaining lower intensity light to reflect said image onto a night camera using a single objective lens set within a housing, the steps comprising:

a. Positioning a large lower coaxial mirror approximately the same diameter as the housing at a lower center end of the housing and at an angle relative to said lens set so as to redirect said image through an intensifier onto said night camera; and b. Positioning a small upper coaxial mirror at a higher center end of the housing, coaxially aligned with said large lower coaxial mirror and said lens set and at an angle relative to said lens set but closer to said lens set than said large lower coaxial mirror, said small upper coaxial mirror redirecting said image to said day camera using a minimum amount of higher intensity incoming light flux at its center.

12. The method of claim 11 wherein said day camera and said night camera are board cameras.

13. The method of claim 11 wherein said small upper coaxial mirror is smaller in diameter than said large lower mirror.

14. The method of claim 11 wherein said intensifier has an 18 mm image intensifier tube.

15. The method of claim 11 wherein said day camera and said night camera are adapted to operate on a mobile platform.

16. The method of claim 11 wherein said day camera and said night camera transmit said image to at least one video display monitor.

17. The method of claim 11 further comprising the step of:

a. Feeding the output from said day camera and said night camera as input to an image fusing means for an enhanced display of said image.

* * * * *